May 30, 1950 DE WITT R. GODDARD 2,509,593

HUMIDITY COMPENSATED OSCILLATOR

Filed May 21, 1947

INVENTOR.
DeWitt R. Goddard
BY Harry Tunick
ATTORNEY

Patented May 30, 1950

2,509,593

UNITED STATES PATENT OFFICE 2,509,593

HUMIDITY COMPENSATED OSCILLATOR

De Witt Rugg Goddard, Riverhead, N. Y., assignor to Radio Corporation of America, a corporation of Delaware Application May 21, 1947, Serial No. 749,481

4 Claims. (Cl. 250—36)

This invention relates to a new and useful stable radio frequency oscillator, the frequency of which will be compensated for changes in humidity.

The purpose of this invention is to further stabilize radio frequency oscillators by providing frequency compensation means for changes in absolute humidity.

Radio frequency oscillators in the prior art devices have various means to correct for changes in temperature, in order to maintain a stable frequency. However, so far as I am aware, no radio frequency oscillator corrects for both temperature and humidity.

One way in which a stable radio frequency oscillator can be made is to use low temperature coefficient components and regulated supply voltages. Another method is to use certain radio frequency elements having high temperature coefficients so as to compensate for other changes in the oscillator circuit. These and other methods together with careful design can produce an oscillator having a high order of frequency stability. However, changes in humidity still represent an uncorrected factor. The system of my invention provides a means whereby the effect of humidity may be compensated for.

It appears that if the medium in which a radio frequency oscillator operates is air or any other gas, then it is the changes in absolute humidity and not relative humidity that cause oscillator frequency variations. Therefore, the system of my invention provides a means for correcting for changes in absolute humidity. Compensation will be obtained for humidity changes by providing a pair of compound strips, each having dissimilar materials, and a link connection from one of the strip structures which is arranged to vary the element of an electrical device.

There are numerous devices that respond to changes in relative humidity. For instance a blond human hair changes its length; certain gelatinous films change their dimensions; some compounds such as lithium hydroxide change their electrical resistance, and so forth.

This invention will best be understood by referring to the accompanying drawings, wherein.

Figures 1, 2:
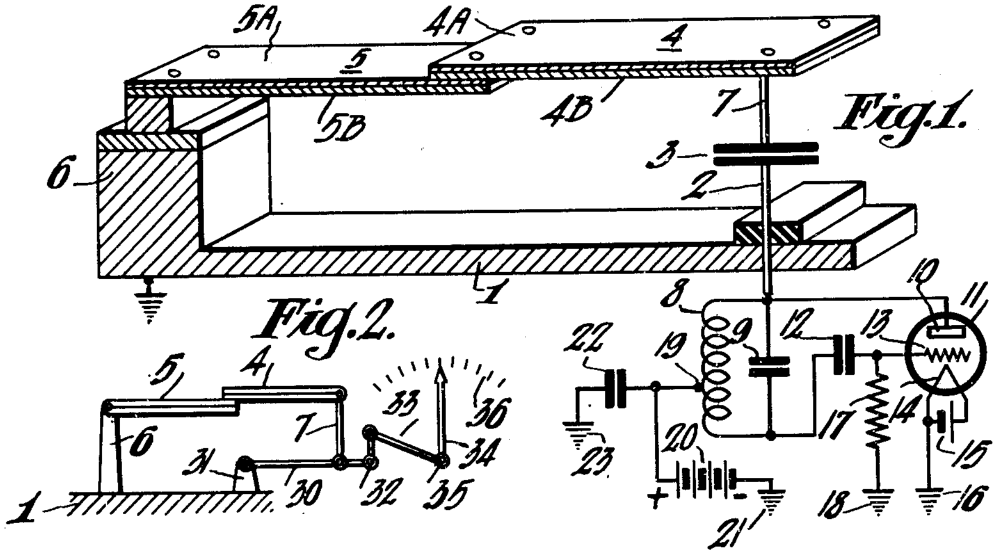
Fig. 1 is a perspective view, partly in section, of a frequency stabilizing device and a circuit diagram of a radio frequency oscillator.
Fig. 2 is a diagrammatic showing of the device of this invention as applied to an indicating instrument.

Referring now in detail to Fig. 1 of the drawing: The compensated oscillator of this invention is supported upon a base 1, preferably of metal, which has insulatedly supported therefrom a fixed electrode plate element 2 of a variable condenser. The variable plate element 3 is supported above plate 2 and arranged to be in capacitive relationship therewith. A composite strip 4 of Invar 4A and gelatin 4B secures plate 3 in a predetermined desired position for a calculated capacity of the condenser. This composite strip will bend upward with a high relative humidity, and downward with a low relative humidity. The strip 4 is bolted to a bi-metallic strip 5 which consists of a thin Invar strip 5A, brazed to a thin brass strip 5B, and supported on a suitable grounded upright support 6. The bi-metallic strip 5 will bend upward for high temperatures and downward for low temperatures. The right hand end of strip 4 is fastened to the movable plate 3 for the compensating condenser 2 by means of a rod or link 7. The compensating condenser plate 3 is arranged so that it provides some frequency variation to stabilize the oscillator which is diagrammatically shown below the base 1. The oscillator comprises a tuned circuit which includes an inductance 8 and a parallelly connected condenser 9. The upper junction of the connection between inductance 8 and condenser 9 connects to the anode 10 of an electron discharge device 11. The lower junction connection of coil 8 and condenser 9 connects to a coupling condenser 12 which couples to grid 13. A cathode 14 is heated by any suitable source, such as a battery 15, one side of which connects to ground at 16. The grid bias resistor 17 completes the grid-cathode circuit by being connected to ground at 18. A tap 19 on coil 8 connects to the positive side of a source of anode potential 20, the negative side of which connects to ground at 21. A by-pass condenser 22 is connected to ground at 23.

The operation of this device is as follows: If, for example, the air surrounding the oscillator system rises in temperature without any change in absolute humidity, then the relative humidity will decrease. Since this calls for no correction, there should be no change in compensating condenser plates 2 and 3, and this is the case, for the rise in temperature causes the bi-metallic strip 5 to bend upward, and the decrease in relative humidity causes the Invar-gelatin strip 4 to bend downward, resulting in no change in the capacity of the condenser plates 2 and 3.

It is to be noted that in this condition one of the compound strips compensates the other; or, in other words, the temperature sensitive element and the relative humidity sensitive element move so as to compensate one another's action.

If, for a second example, the absolute humidity increases with no change in temperature, then, of course, the relative humidity must increase and this increase in relative humidity causes the gelatin-Invar strip 4 to bend upward, decreasing the capacity of compensating condenser plates 2 and 3. It will be noted, in this example, that there will be no change in the bi-metallic strip because there is no temperature change.

From the above examples, it may be seen that a device sensitive to changes only in absolute humidity has been provided, and means shown whereby this sensitivity may be made to actuate any variable element of an electrical device, such as the compensating condenser of a radio frequency oscillator.

Referring now to Fig. 2 of the drawings, the bimetallic structure (which includes members 1 to 7, inclusive) is similar to that of Fig. 1; except that the link 7, instead of terminating in a variable condenser, is pivoted to an arm 30 which is pivoted to an upright 31 at one end and at the other end thereof is linked at 32 to an arm 33. This arm supports a pointer 34 which is pivoted at 35. A suitable scale 36 is provided for the pointer 34. It will be noted that this combination of compound strips 4 and 5 is used to actuate the pointer 34 or any other suitable indicator. By calibrating the scale 36 in terms of absolute humidity, or any other suitable indicating data, the device can be used as a humidity indicator.

Figures 3, 4:
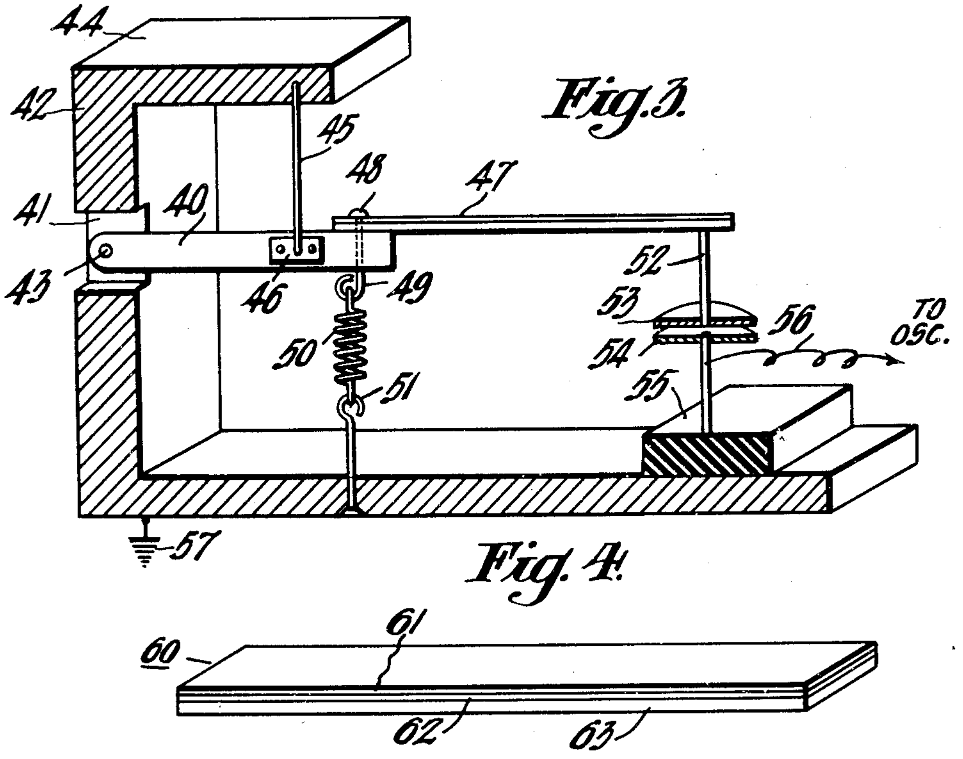
Fig. 3 is a perspective view, partly in section, of another frequency stabilizing device of this invention.
Fig. 4 is a detailed perspective view of a humidity sensitive element.

Fig. 3 illustrates another arrangement somewhat similar to that of Fig. 1, except that the bimetallic strip 5 is substituted by a solid bar 40 which is pivoted in a slot 41 cut in a frame 42, the pivot being provided by a pin 43. Frame 42 is provided with an upright support portion 44 to which is secured human hairs 45 which are fastened to bar 40 by means of a clamp strip 46. The forward end of bar 40 supports a bi-metallic strip 47, and these are secured together by a rivet 48. The lower portion of rivet 48 is provided with a hook portion 49 to which is fastened a helical tension spring 50. The spring 50 is secured to base 42 by means of a hook member 51. The free end of bi-metallic strip 47 is provided with a link 52 for supporting the movable plate element 53 of a variable condenser. The fixed plate element 54 is insulatingly supported on frame 42 by means of a block of insulation 55. Electrical connection to the oscillator circuit is made by means of a flexible terminal lead 56 which connects to the junction point of inductance 8 and condenser 9 of the circuit shown in Fig. 1. The terminal connection from the variable plate element 53 is made by means of a ground connection 57 on the frame 42.

The operation of the device shown in Fig. 3 is somewhat similar to that mentioned above in connection with Fig. 1, except that the compensating condenser and the elements 53 and 54 are actuated by the motion of the solid bar 40, which motion is controlled by the expansion and contraction of the human hairs 45. These hairs expand and contract in accordance with changes in relative humidity.

Fig. 4 shows another type of bar which can be substituted for the bar consisting of the strips 4 and 5 of Fig. 1. This substitute type of bar consists of a bi-metallic strip 60 composed of an Invar strip 61 and a brass strip 62 molded or pressed together with a coating of gelatinous substance 63 which expands and contracts in accordance with changes in relative humidity. It would, of course, be necessary for the Invar and brass strips 61 and 62, respectively, to be very thin in order to bend from the relatively feeble forces supplied by the gelatinous film 63. The action of this bar with changes in absolute humidity and variations in temperature would be the same as described in connection with the oscillator and circuit described in connection with Fig. 1.

What is claimed is:

1. A radio frequency oscillator comprising two strips, each having dissimilar materials, one of said strips being composed of Invar and brass, the other one of said strips being composed of a gelatin film and an Invar strip one of said strips being supported at one end thereof and joined to said other strip at the other end thereof, means to link said other strip to a frequency determining element of said oscillator, whereby any change in absolute humidity will be compensated for to maintain the frequency of said oscillator stable.

2. A compensated electrical device comprising an electrical oscillator, two strips, each having dissimilar materials, one of said strips being composed of Invar and brass, the other of said strips being composed of a gelatin film and an Invar strip, one of said strips being supported at one end thereof and joined to said other strip at the other end thereof, means at the unsupported end of the other strip to link a frequency determining element of said electrical oscillator, whereby any change in absolute humidity will be compensated for.

3. A radio frequency oscillator comprising two strips, each having dissimilar materials, one of said strips being composed of Invar and brass, the other one of said strips being composed of a gelatin film and an Invar strip one of said strips being supported at one end thereof and joined to said other strip at the other end thereof, means to link said other strip to a variable plate of an electrical condenser which forms part of said oscillator circuit, whereby any change in absolute humidity will be compensated for to maintain the frequency of said oscillator stable.

4. The combination of a compound strip and a radio frequency oscillator circuit, said compound strip including two strips each having dissimilar materials one of said strips being supported at one end thereof and joined to said other strip at the other end thereof, and means to link one of said strips to a frequency determining element of said oscillator circuit whereby any change in absolute humidity will be compensated for to maintain the frequency of said oscillator constant.

DE WITT RUGG GODDARD.

REFERENCES CITED

The following references are of record in the file of this patent:

UNITED STATES PATENTS

| Number | Name | Date |
|---|---|---|
| 798,938 | Wetherill | Sept. 5, 1905 |
| 974,684 | McAdie | Nov. 1, 1910 |
| 1,544,342 | Phelan | June 30, 1925 |
| 1,658,953 | Theremin | Feb. 14, 1928 |
| 2,053,492 | Otto | Sept. 8, 1936 |
| 2,080,950 | Otto | May 18, 1937 |
| 2,367,924 | Briggs | Jan. 23, 1945 |
| 2,469,537 | Wohrer | May 10, 1949 |